E. W. & P. J. EVANS.
VEHICLE TIRE.
APPLICATION FILED MAY 23, 1908.
967,506.
Patented Aug. 16, 1910.
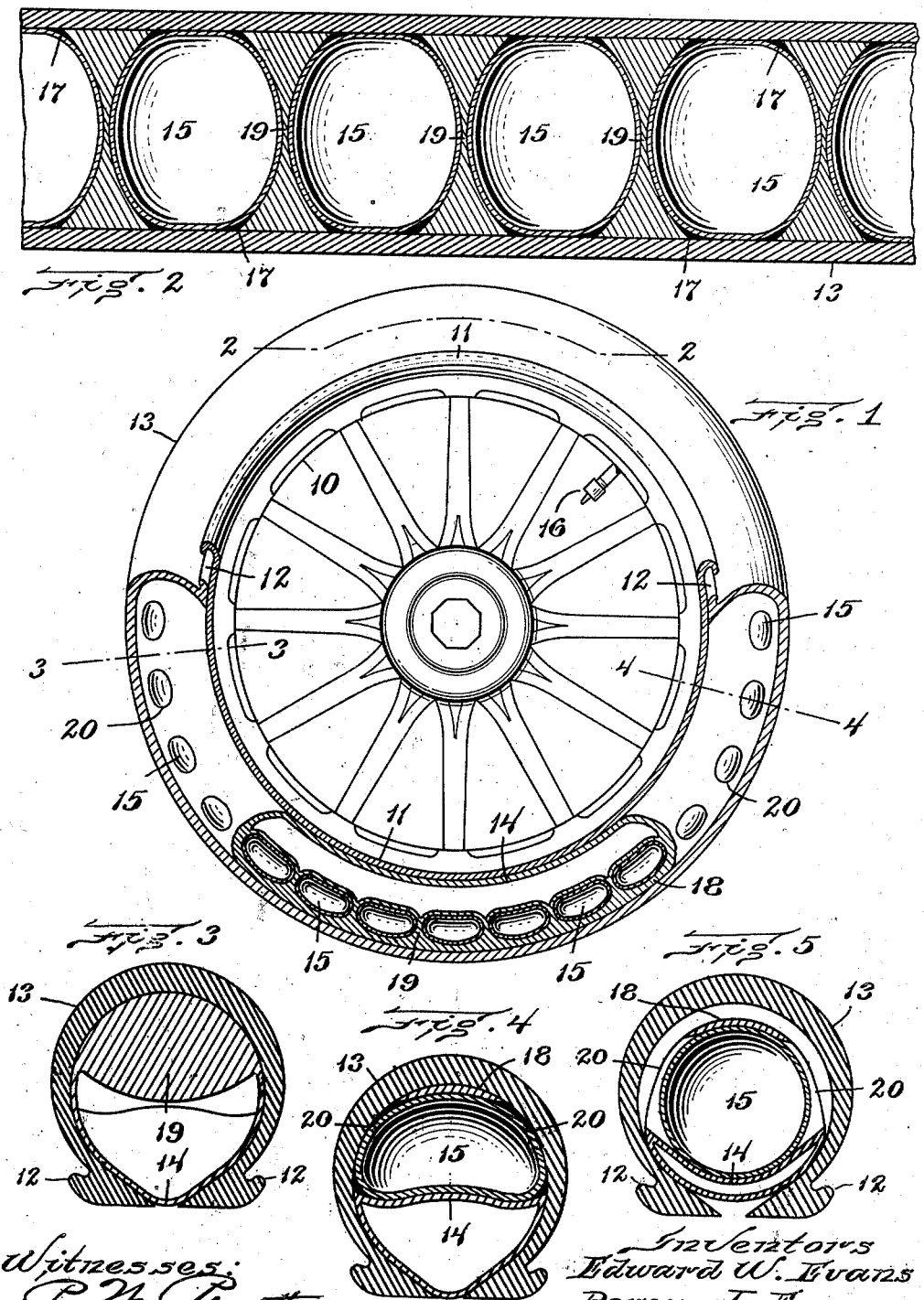

UNITED STATES PATENT OFFICE.

EDWARD W. EVANS AND PERCY J. EVANS, OF WALTHAM, MASSACHUSETTS.

VEHICLE-TIRE.

967,506.

Specification of Letters Patent.

Patented Aug. 16, 1910.

Application filed May 23, 1908. Serial No. 434,549.

*To all whom it may concern:*

Be it known that we, EDWARD W. EVANS and PERCY J. EVANS, of Waltham, in the county of Middlesex and State of Massachusetts, have invented certain new and useful Improvements in Vehicle-Tires, of which the following is a specification.

This invention has relation to vehicle tires such as those used for motor vehicles, and has for its object to provide a resilient tire composed of a series of removable pneumatic cells, which, when punctured or otherwise damaged, may be separately removed and replaced by new cells.

In carrying out the invention, the tire is composed of an outer covering or shoe adapted to inclose an inner pneumatic tube and a series of separate pneumatic cells interposed between the pneumatic tube and the tread of the shoe and adapted to be compressed therebetween when the inner tube is inflated. In effect, the greater part of the area inclosed within the outer covering is air chambers, and, while not proof against puncture, is adapted by reason of the removability of the separate cells to be easily and quickly repaired by substituting a new cell when one becomes damaged. By so constructing the tire, liability of complete uselessness is avoided in case of puncture, and at the same time a relatively great proportion of the advantages of a simple pneumatic tire are retained.

Referring to the drawings, forming a part of this specification,—Figure 1 represents a motor vehicle wheel in elevation, provided with a tire constructed in accordance with this invention, and partially broken away at different points. Fig. 2 is a section on the line 2—2 of Fig. 1. Fig. 3 is a section on the line 3—3 of Fig. 1 taken between two of the removable cells. Fig. 4 is a section on the line 4—4 of Fig. 1, through one of the removable cells and shows the tire in its inflated condition. Fig. 5 is a section similar to Fig. 4, except that it illustrates the same in deflated condition.

The same reference characters indicate the same parts wherever they occur.

10 represents the wooden felly of the wheel, which is surrounded by a metal rim 11 of the so-called "clencher type." The edges of the rim 11, which are curled over, are adapted to engage and retain ribs 12 12 of a removable outer covering or shoe 13. The shoe is adapted to contain an elastic pneumatic inner tube 14 and a series of separate elastic cells or balls 15, arranged in a concentric series between the rim of the shoe and the pneumatic tube 14. The pneumatic tube is provided with a suitable valve contained in a valve stem 16, and, when inflated, is adapted to compress the balls or cells 15 between it and the rim of the shoe 13, as shown by Fig. 4. In this way, a greater part of the cross-sectional area of the tire is filled with compressed air which is the most resilient form of tire known.

In order to maintain the cells or balls in their proper relative positions, there may be a container provided with pockets 17, one for each of the balls or cells. The container is shown as formed integrally with the pneumatic tube 14, and it has a rim 18 which intervenes between the shoe 13 and the balls, and it also has walls or partitions 19 extending transversely so as to separate the balls from each other and hold them properly spaced. By reason of providing a container of this character, the balls are protected against undue chafing when they become alternately compressed and expanded.

In order to facilitate the insertion and removal of the balls, the pockets 17 have side openings 20, one at either side of the tire, and therefore have the form of apertures extending transversely. In case one of the balls or cells 15 is rendered useless, there still remain within the shoe sufficient compressed air cells to preserve the tire in an operative condition, and therefore the liability of serious accidents, due to punctured tires, is thereby avoided. When it is desired to replace a damaged cell by a new one, the ribs 12 may be disengaged in the usual way from the clencher rim and the damaged cell removed laterally by pushing it through one of the apertures 20, and a new cell can be readily inserted in the same way. Before inserting a new cell, however, it is preferable to deflate the tube 14 in order that the pocket 17 may resume its normal shape, in which the cell in its normal shape may be more readily inserted. When the tube 14 is deflated, there is sufficient looseness within the shoe 13 to permit a damaged cell to be removed and a new one inserted through one of the side openings 20, without removing the entire shoe. This may be effected by simply removing the usual ring which holds one of the ribs 12 of the shoe, then locally displacing a portion of the shoe to expose the pocket containing the damaged cell. Therefore, it is not necessary to remove the whole tire in order to effect a local repair by the substitution of a new cell for a damaged one. It may be seen by reference to Figs. 2 and 4 that, when the cells are compressed out of their normal shape by inflation of the tube 14, they are in effect locked within their respective pockets.

The pneumatic tube 14 and the ball container, herein shown as formed integrally and hereinafter termed an inner member, are adapted to retain the removable cells under all conditions, so that, in case the so-called inner member is for any reason entirely detached, the cells will not drop out of their respective pockets.

Owing to the fact that both sides of the pockets are open, removal of any of the balls or cells is facilitated, especially if the outer covering is entirely removed, because then, either one or more of the balls or cells may be pushed out, which operation could not be performed when there is but a single peripheral opening at the tread surface.

Another advantage of the present structure is best illustrated in Figs. 1 and 4, in which it will be seen that the thickness of the material which separates the pneumatic tube from the cells is thin and substantially uniform, whereby the shapes of the tube and cells will conform to each other under pressure. In other words, when the pneumatic tube is inflated, the entire area of its outer wall is forced against the individual balls or cells, so that there becomes an equality of pressure, the pressure against the balls or cells being spread over the entire bases thereof.

Another advantage of the present structure is illustrated in Figs. 4 and 5, from which it will be seen that a relatively thin portion of the container is interposed between each ball or cell and the outer covering, this thin portion being furnished by the rim 18 so that the balls or cells cannot drop out of the container when the outer covering is removed.

Although the removable members 15 are herein illustrated as closed hollow cells, the invention is not limited to members of this character, for in their place other compressible units might be employed.

Having thus explained the nature of our said invention and described a way of constructing and using the same, although without attempting to set forth all of the forms in which it may be made, or all of the modes of its use, what we claim is:

1. A vehicle tire, comprising a continuous circular resilient cell container provided with pockets arranged in a series about the rim thereof, both sides of the pockets being open, a resilient cell in each pocket, and a flexible outer covering, a portion of the container being interposed between the outer wall of each cell and said outer covering.

2. A vehicle tire, comprising an integral elastic circular inner member formed with a pneumatic chamber and also with pockets arranged in a series between said chamber and the outside rim, said pockets having side openings, an elastic ball in each pocket, and an outer covering inclosing the inner member and balls.

3. A vehicle tire, comprising a circular elastic inner member having an outer rim and having pockets provided with side openings, an elastic cell in each pocket, a concentric pneumatic tube surrounded by the series of pockets and adapted when inflated to compress the cells against the outer rim, the thickness of the material separating the tube from the cells being thin and substantially uniform, whereby the shapes of the tube and cells will conform to each other under pressure, and an outer covering inclosing the inner member and balls.

In testimony whereof we have affixed our signatures, in presence of two witnesses.

EDWARD W. EVANS.
PERCY J. EVANS.

Witnesses:
GEORGE F. ROBBINS,
JOHN H. YEO.